US012587735B2

(12) United States Patent　　　(10) Patent No.:　　US 12,587,735 B2

Kondo et al.　　　(45) Date of Patent:　　Mar. 24, 2026

(54) IMAGING APPARATUS, METHOD FOR CONTROLLING THE SAME, AND STORAGE MEDIUM

(71) Applicant: CANON KABUSHIKI KAISHA, Tokyo (JP)

(72) Inventors: Emi Kondo, Tokyo (JP); Satoru Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 18/538,906

(22) Filed: Dec. 13, 2023

(65) Prior Publication Data

US 2024/0205537 A1　　Jun. 20, 2024

(30) Foreign Application Priority Data

Dec. 14, 2022　(JP) ................................. 2022-199796

(51) Int. Cl.
　H04N 23/60　　　(2023.01)
　H04N 23/667　　(2023.01)
(52) U.S. Cl.
　CPC ........... H04N 23/64 (2023.01); H04N 23/667 (2023.01)
(58) Field of Classification Search
　CPC .... H04N 23/64; H04N 23/667; H04N 23/611; H04N 23/633; H04N 23/634; H04N 23/673; H04N 23/661; H04N 23/67
　See application file for complete search history.

(56) References Cited

U.S. PATENT DOCUMENTS

2014/0198230 A1* 7/2014 Tsutsumi ............... H04N 23/45
　　　　　　　　　　　　　　　　　　　　348/218.1
2018/0045867 A1* 2/2018 Kunugise ............... G03B 11/00
2022/0284214 A1* 9/2022 Tomasetta ............ G06V 40/172

FOREIGN PATENT DOCUMENTS

JP　　　　2017028376 A　　2/2017

* cited by examiner

*Primary Examiner* — Yogesh K Aggarwal

(74) *Attorney, Agent, or Firm* — Canon U.S.A., Inc. IP Division

(57)　　　　　　ABSTRACT

An imaging apparatus includes a sensor, a light-emitting device, one or more processors, and one or more memories. The sensor captures an image of an object through a lens. The light-emitting device provides a notification of a focus state. The one or more memories contain instructions that, when executed by the one or more processors, perform operations as a focus detection unit and a notification control unit. The focus detection unit detects a focus state of the object. The notification control unit controls whether to provide the notification of the focus state using the light-emitting device. The light-emitting device is arranged near the lens on a surface of a side of the imaging apparatus on which the lens is arranged. The notification control unit determines whether to provide the notification of the focus state of the object using the light-emitting device.

17 Claims, 6 Drawing Sheets

FIG. 2

BLINK

BLINK

BLINK

IMAGING APPARATUS, METHOD FOR CONTROLLING THE SAME, AND STORAGE MEDIUM

BACKGROUND

Technical Field

One disclosed aspect of the embodiments relates to an imaging apparatus, a method for controlling the imaging apparatus, and a storage medium.

Description of the Related Art

In general, as methods for capturing an image of yourself as an object, a method of capturing your image by pointing a lens of a camera at yourself, and a method of asking someone to capture your image are known. With these methods, you can recognize a focus state of yourself as an object, i.e., recognize whether you are in focus during imaging.

Japanese Patent Application Laid-open No. 2017-28376 discusses a digital camera in which an in-focus frame indicating an in-focus state is displayed on a display in a case where the display, which is rotatably mounted on a main body of the digital camera, is turned toward yourself as an object.

However, to check whether you are in focus by yourself as an object while you are capturing your image with the digital camera discussed in Japanese Patent Application Laid-open No. 2017-28376, you have to look away from a lens to look at the display of the digital camera. If you look away from the lens in this way, an image in which the object looks away from the lens is recorded, and it takes time and effort to record the image again.

SUMMARY

One disclosed aspect of the embodiments is directed to providing an imaging apparatus that enables an object to check a focus state without looking away from a lens, a method for controlling the imaging apparatus, and a storage medium.

According to an aspect of the embodiments, an imaging apparatus includes a sensor, a light-emitting device, one or more processors, and one or more memories. The sensor is configured to capture an image of an object through a lens. The light-emitting device is configured to provide a notification of a focus state. The one or more memories contain instructions that, when executed by the one or more processors, perform operations as a focus detection unit and a notification control unit. The focus detection unit is configured to detect a focus state of the object. The notification control unit is configured to control whether to provide the notification of the focus state using the light-emitting device. The light-emitting device is arranged near the lens on a surface of a side of the imaging apparatus on which the lens is arranged. The notification control unit determines whether to provide the notification of the focus state of the object using the light-emitting device.

According to another aspect of the embodiments, a method for controlling an imaging apparatus includes capturing an image of an object through a lens, detecting a focus state of the object, providing a notification of the focus state, and controlling whether to provide the notification of the focus state. The notification of the focus state is provided using a light-emitting device that is arranged near the lens on a surface of a side of the imaging apparatus on which the lens is arranged, and the controlling includes determining whether to provide the notification of the focus state of the object using the light-emitting device.

Further features of the disclosure will become apparent from the following description of exemplary embodiments with reference to the attached drawings.

BRIEF DESCRIPTION OF THE DRAWINGS

FIG. 2 is a block diagram illustrating a configuration of the digital camera that is an example of the imaging apparatus according to the exemplary embodiment.

DESCRIPTION OF THE EMBODIMENTS

Figure 1A:
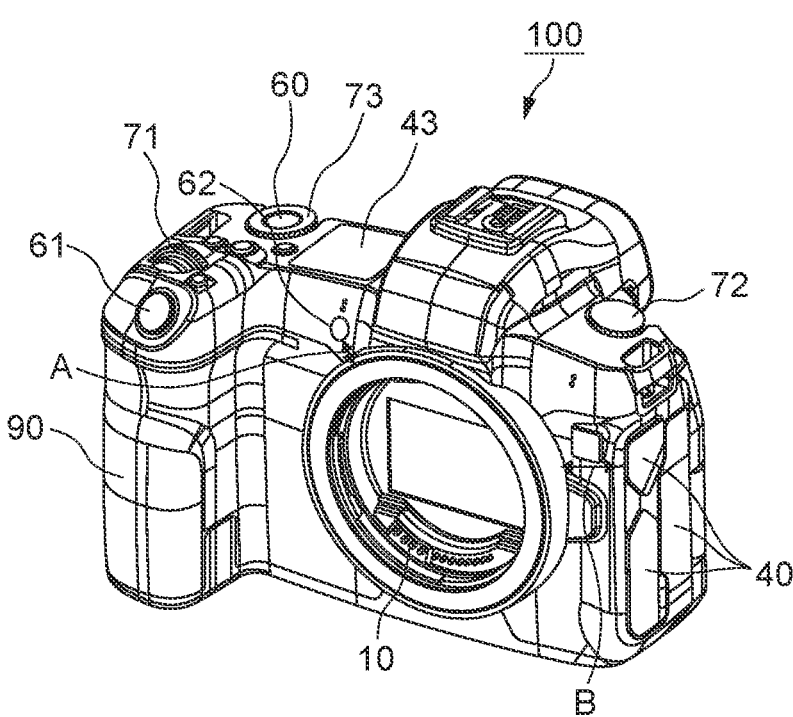
FIGS. 1A and 1B are diagrams illustrating an external appearance of a digital camera that is an example of an imaging apparatus according to an exemplary embodiment.

An exemplary embodiment of the present disclosure will be described in detail below with reference to the attached drawings.

In the present specification and drawings, components having substantially the same functional configuration are assigned the same reference numerals, and the duplicate descriptions thereof will be omitted.

<Configuration of Imaging Apparatus>

Figure 1B:
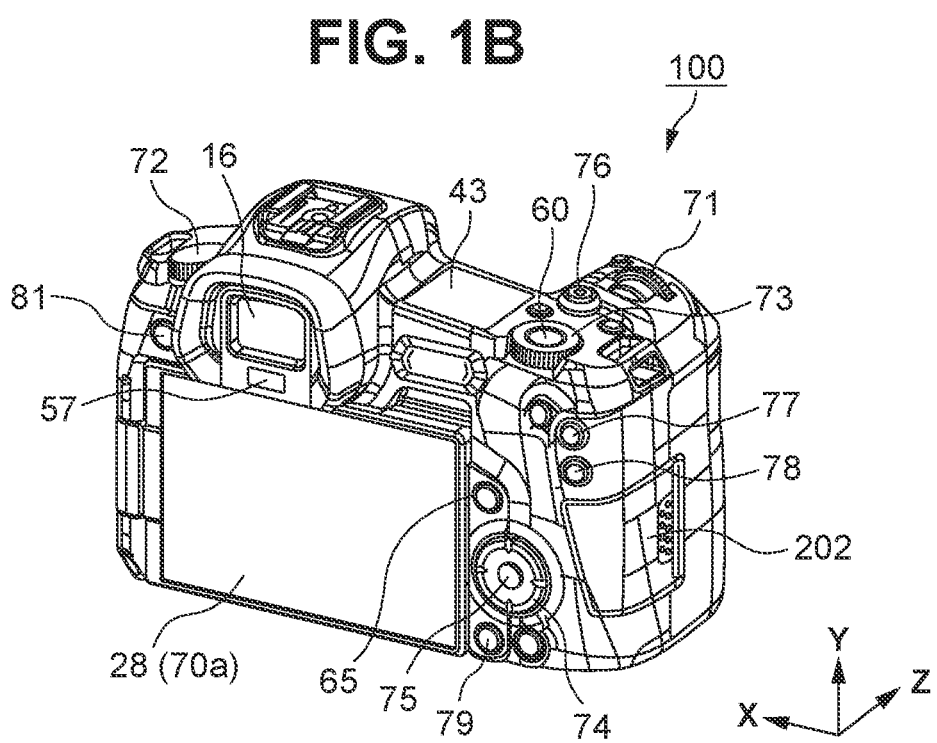

FIGS. 1A and 1B illustrate an external appearance of a digital camera 100 that is an example of an imaging apparatus according to an exemplary embodiment. FIG. 1A is a perspective view of a front side of the digital camera 100, and FIG. 1B is a perspective view of a back side of the digital camera 100. In FIG. 1B, a display 28 (a display unit) is configured to display an image and various kinds of information and is arranged on the back side of the digital camera 100. The display 28 may be of a movable type. If the display 28 of a movable type is used, a user can change an orientation of the display 28 in various directions. A part of the digital camera 100 excluding the display 28 is referred to as a main body.

A touch panel 70a is configured to detect a touch operation onto a display surface (an operation surface) of the display 28. An out-of-viewfinder display 43 is a display unit that is arranged on an upper surface of the digital camera 100 to display various setting values of the digital camera 100, such as a shutter speed and an aperture value. A shutter button 61 is an operation unit used to issue an imaging instruction. A mode selection switch 60 is an operation unit used to switch between various modes. Terminal covers 40 are used to protect connectors (not illustrated) for connecting the digital camera 100 and cables for connection to external apparatuses.

Figure 2:
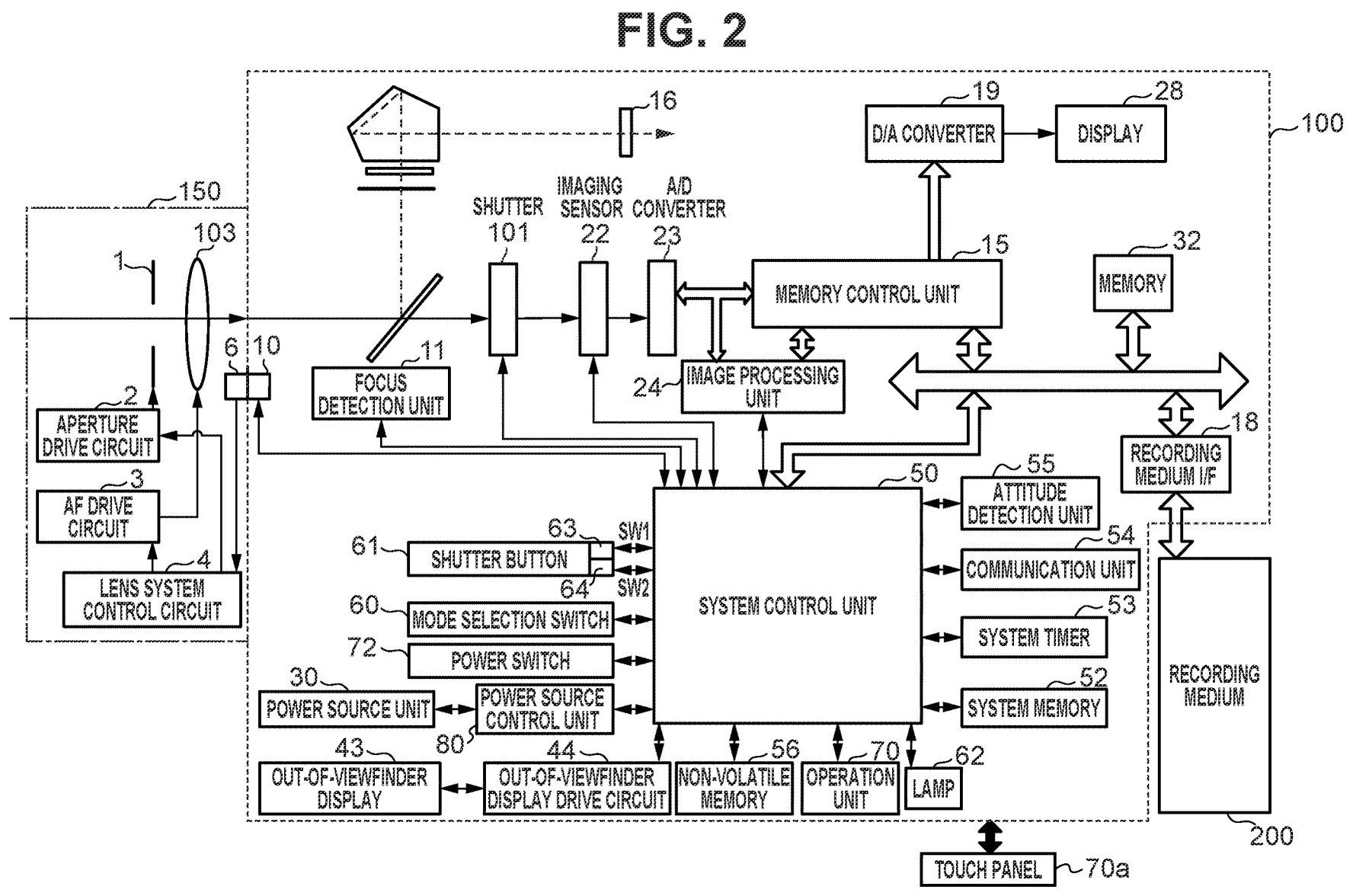

A main electronic dial 71 is a rotational operation member included in an operation unit 70 (see FIG. 2). Rotating the main electronic dial 71 enables changing the setting values such as the shutter speed and the aperture value.

A power switch 72 is an operation member used to switch the digital camera 100 between power ON and OFF. A sub electronic dial 73 is a rotational operation member included in the operation unit 70 and is configured to move a selection frame or perform an image advancing operation.

A four-way operational key 74 is included in the operation unit 70 and is a cross key operation member (a four-direction key) including four push buttons that are located in top, bottom, left, and right portions of the four-way operational key 74 and can be pressed in four respective directions. An operation of the digital camera 100 corresponding to the direction of a pressed portion of the four-way operational key 74 can be performed. A SET button 75 is a push button included in the operation unit 70 and is mainly used to set a selected item. A moving image button 76 is used to issue an instruction to start or stop capturing a moving image.

An automatic exposure (AE) lock button 77 is included in the operation unit 70 and can be pressed in an imaging standby state to fix an exposure state. An enlargement button 78 is included in the operation unit 70 and is an operation button used to turn ON and OFF an enlargement mode in a live view display in an imaging mode. A live view image can be enlarged and reduced when the enlargement mode is turned ON and then the main electronic dial 71 is operated. In a reproduction mode, the main electronic dial 71 functions as an enlargement button to enlarge a reproduction image, i.e., to increase an enlargement ratio thereof.

A reproduction button 79 is included in the operation unit 70 and is an operation button used to switch between the imaging mode and the reproduction mode. The digital camera 100 shifts to the reproduction mode when the reproduction button 79 is pressed during the imaging mode, so that the latest image among images recorded in a recording medium 200 (see FIG. 2) can be displayed on the display 28. A menu button 81 is included in the operation unit 70 and can be pressed to display, on the display 28, a menu screen on which various settings can be made.

The user can make various settings intuitively using the menu screen displayed on the display 28, the four-way operational key 74, the SET button 75, or a multi-controller (MC) 65. The MC 65 is configured to receive direction instructions in eight directions, and a push-in operation on a central part of the MC 65. A communication terminal 10 is used by the digital camera 100 to communicate with a lens unit 150 (described below) that is detachably attached to the digital camera 100.

An eyepiece portion 16 is designed for an eyepiece viewfinder (a look-in type viewfinder). The user can visually check an image with an optical viewfinder (OVF) inside the digital camera 100 via the eyepiece portion 16. An eye contact detection unit 57 is an eye contact detection sensor configured to detect whether the user's eye is in contact with the eyepiece portion 16. A cover 202 is configured to cover a slot in which the recording medium 200 is stored.

A grip portion 90 has a shape that is easy to grip with the user's right hand when the user holds the digital camera 100 to capture an image. The shutter button 61 and the main electronic dial 71 are arranged at positions where the user can operate the shutter button 61 and the main electronic dial 71 with the user's right index finger in a state where the user holds the digital camera 100 while gripping the grip portion 90 with the user's right little finger, ring finger, and middle finger. The sub electronic dial 73 is arranged at a position where the user can operate the sub electronic dial 73 with the user's right thumb in the same state.

A lamp 62 is a light-emitting member or device configured to emit light, and the digital camera 100 according to the present exemplary embodiment uses the lamp 62 to notify the user of a focus state. The lamp 62 is a light emitting diode. In general, the lamp 62 is used as a self-timer lamp and automatic focus (AF) auxiliary light. In the present exemplary embodiment, the lamp 62 is used to notify the user of a focus state. The lamp 62 performs at least one of operations of turning on, turning off, and blinking the lamp 62 in order to provide the notification to the user as an object toward which a lens 103 (described below) is oriented.

The digital camera 100 includes the main body (the part of the digital camera 100 excluding the display 28) and the display 28 that is configured to move with respect to the main body. In this case, a distance (indicated by a double-headed arrow A in FIG. 1A) from the lens 103 to the lamp 62 is shorter than a distance (indicated by a double-headed arrow B in FIG. 1A) from the lens 103 to a lateral side (an edge of a side surface) of the main body on a side on which the display 28 is located in a case where the display surface of the display 28 is facing toward an object side. Since the lamp 62 is arranged closer to the lens 103 than the display 28, the user is less likely to look away from the lens 103 and can record a natural image.

<Block Diagram>

FIG. 2 is a block diagram illustrating a configuration of the digital camera 100 that is an example of the imaging apparatus according to the present exemplary embodiment. In FIG. 2, the lens unit 150 is an interchangeable lens unit including an imaging lens (the lens 103). The lens 103 generally includes a plurality of lenses, but in the present exemplary embodiment, only one lens 103 is illustrated for simplification.

A communication terminal 6 is used by the lens unit 150 to communicate with the digital camera 100. The lens unit 150 communicates with a system control unit 50 via the communication terminal 6 and the communication terminal 10 described above and causes a lens system control circuit 4 in the lens unit 150 to control an aperture 1 via an aperture drive circuit 2. The lens system control circuit 4 then performs focusing by moving the lens 103 via an AF drive circuit 3.

A shutter 101 is a focal plane shutter that can freely control an exposure time of an imaging sensor 22 controlled by the system control unit 50.

The imaging sensor 22 is an image sensor, such as a charge-coupled device (CCD) sensor or a complementary metal-oxide semiconductor (CMOS) sensor, which converts an optical image into an electrical signal. An analog-to-digital (A/D) converter 23 is used to convert an analog signal output from the imaging sensor 22 into a digital signal.

An image processing unit 24 performs predetermined pixel interpolation processing, resize processing (e.g., size reduction), and color conversion processing, on data output from the A/D converter 23 or data output from a memory control unit 15 (described below). The image processing unit 24 also performs predetermined calculation processing using captured image data. Based on the calculation result obtained by the image processing unit 24, the system control unit 50 performs exposure control and range-finding control. In this way, through-the-lens (TTL) system AF processing, AE processing, and electronic flash preliminary emission (EF) processing are performed. The image processing unit 24 further performs predetermined calculation processing using captured image data and, based on the obtained calculation result, performs predetermined TTL system automatic white balance (AWB) processing.

The image processing unit 24 performs object detection processing using an image signal to detect one or a plurality of pieces of object information (e.g., position, size, and reliability). In the object detection processing, the type of object (person or product) can also be detected. In a case where the digital camera 100 is set to an AF mode, the system control unit 50 uses an AF frame to set a detected object as an AF target object and moves the lens 103 via the AF drive circuit 3, thereby performing the AF processing to focus on the object detected through the object detection processing.

A focus detection unit 11 sets a focus detection area, detects a defocus amount of the focus detection area, and outputs the detected defocus amount as a focus detection result. In the case of the AF mode, the focus detection unit 11 sets the AF frame or the area of the object set as the AF target object, as the focus detection area. Then, the system control unit 50 transmits, to the lens system control circuit 4, the focus detection result (the defocus amount) obtained by the focus detection unit 11 or a lens driving amount calculated based on the focus detection result. The AF drive circuit 3 controlled by the lens system control circuit 4 controls the movement of the lens 103 to perform an AF operation in order to focus on the detected object.

The memory control unit 15 controls data transmission and reception between the A/D converter 23, the image processing unit 24, and a memory 32. The data output from the A/D converter 23 is written to the memory 32 via the image processing unit 24 and the memory control unit 15, or directly via the memory control unit 15. The memory 32 stores the image data obtained by the A/D converter 23 converting the data obtained by the imaging sensor 22 into digital data, and the image data to be displayed on the display 28. The memory 32 has enough storage capacity to store a predetermined number of still images or a predetermined time of moving images and audio signals.

The memory 32 also serves as a memory (a video memory) for image display.

The image data to be displayed, which is written in the memory 32, is displayed on the display 28 via a digital-to-analog (D/A) convertor 19 and the memory control unit 15. The display 28 performs the display corresponding to the signal from the memory control unit 15 on a display device, such as a liquid crystal display (LCD) or an organic electroluminescence (EL) display. The data that is obtained through A/D-conversion by the A/D converter 23 and is stored in the memory 32 is sequentially transferred to and displayed on the display 28, thereby enabling live view display (LV display). An image displayed in live view will hereinafter be referred to as a live view image (an LV image).

The out-of-viewfinder display 43 displays various setting values of the digital camera 100, such as the shutter speed and the aperture value, via an out-of-viewfinder display drive circuit 44. A non-volatile memory 56 is an electrically erasable/recordable memory and is, for example, a flash read-only memory (ROM). The non-volatile memory 56 stores constants, programs, and the like for operating the system control unit 50. The programs described herein are computer programs for implementing each processing in a flowchart (described below) according to the present exemplary embodiment.

The system control unit 50 includes at least one processor or one circuit and controls the entire operation of the digital camera 100. Each processing (described below) according to the present exemplary embodiment is implemented by executing the programs stored in the non-volatile memory 56 described above. The executed programs perform operations that may be considered functions or units. For example, a random-access memory (RAM) is used as a system memory 52, and constants, variables, and programs read from the non-volatile memory 56, which are used to operate the system control unit 50, are loaded into the system memory 52. The system control unit 50 also performs display control by controlling the memory 32, the display 28, and the like. A system timer 53 is a time measurement unit that is configured to measure the time used for various kinds of controls and the time of a built-in clock.

The mode selection switch 60, a first shutter switch 63, a second shutter switch 64, and the operation unit 70 are operation units used to input various operation instructions to the system control unit 50. The mode selection switch 60 switches the operation mode of the system control unit 50 between a still image capturing mode and a moving image capturing mode. Examples of modes included in the still image capturing mode include an automatic imaging mode, an automatic scene determination mode, a manual mode, an aperture priority mode (or Av mode), a shutter-speed priority mode (or Tv mode), and a program AE mode (or P mode). Examples of the modes included in the still image capturing mode further include various scene modes as imaging settings for different imaging scenes, and a custom mode. The user can directly switch the operation mode to one of the above-described modes using the mode selection switch 60. Alternatively, the user may temporarily switch the screen to an imaging mode list screen using the mode selection switch 60, and then select one of a plurality of modes displayed on the list screen and switch the operation mode to the selected one using another operation member. Similarly, the moving imaging mode may include a plurality of modes.

The first shutter switch 63 becomes ON in the middle of operation of the shutter button 61 arranged on the digital camera 100, i.e., in a half pressed state of the shutter button 61 (for issuing an imaging preparation instruction), thereby generating a first shutter switch signal SW1. With the first shutter switch signal SW1, the digital camera 100 starts imaging preparation operations, such as the AF processing, the AE processing, the AWB processing, and the EF processing.

The second shutter switch 64 becomes ON upon completion of the operation of the shutter button 61, i.e., in a fully pressed state of the shutter button 61 (for issuing an imaging instruction), thereby generating a second shutter switch signal SW2. With the second shutter switch signal SW2, the system control unit 50 starts a series of imaging and recording processes from reading the signal from the imaging sensor 22 to writing the captured image as an image file to the recording medium 200.

The operation unit 70 includes various operation members serving as input units for receiving operations from the user. The operation unit 70 includes the shutter button 61, the MC 65, the touch panel 70a, the main electronic dial 71, and the power switch 72. The operation unit 70 also includes the sub electronic dial 73, the four-way operational key 74, the SET button 75, the moving image button 76, the AE lock button 77, the enlargement button 78, the reproduction button 79, and the menu button 81.

A power source control unit 80 includes a battery detection circuit, a direct current to direct current (DC-DC) converter, and a switch circuit for switching the blocks to be powered, and detects whether a battery is attached, a battery type, and remaining battery power. Based on a result of the detection and an instruction from the system control unit 50, the power source control unit 80 controls the DC-DC converter to supply an appropriate voltage to each of the components including the recording medium 200 for an appropriate period. A power source unit 30 includes a primary battery such as an alkaline battery or a lithium battery, a secondary battery such as a nickel-cadmium (NiCd) battery, a nickel-metal hydride (NiMH) battery, or a lithium (Li) battery, and an alternate current (AC) adapter.

A recording medium interface (I/F) 18 is an interface with the recording medium 200 such as a memory card or a hard disk. The recording medium 200 is, for example, a memory card for recording captured images and includes a semiconductor memory or a magnetic disk.

A communication unit 54 is connected to external devices wirelessly or with a cable to transmit and receive image signals and audio signals to and from the external devices. The communication unit 54 is also connectable to a wireless local area network (LAN) or the Internet. The communication unit 54 can also communicate with the external devices using Bluetooth® or Bluetooth® Low Energy. The communication unit 54 can transmit, to the external devices, the images (including live view images) captured by the imaging sensor 22 and the images recorded in the recording medium 200 and can receive images and other kinds of information from the external devices.

An attitude detection unit 55 detects an attitude of the digital camera 100 with respect to a gravitational direction. Based on the attitude detected by the attitude detection unit 55, the attitude detection unit 55 can determine whether the image captured by the imaging sensor 22 is captured with the digital camera 100 held in a landscape orientation or a portrait orientation. The system control unit 50 can add orientation information corresponding to the attitude detected by the attitude detection unit 55 to the image file of the image captured by the imaging sensor 22 or can rotate and record the image. As the attitude detection unit 55, an acceleration sensor or a gyroscope sensor can be used. Using the acceleration sensor or the gyroscope sensor as the attitude detection unit 55, the movement (e.g., panning, tilting, lifting, or standing) of the digital camera 100 can also be detected.

The touch panel 70a and the display 28 can be integrally formed. For example, the touch panel 70a is configured to have a light transmission ratio that does not interrupt the display of the display 28 and is attached to an upper layer of the display surface of the display 28. Then, input coordinates on the touch panel 70a and display coordinates on a display screen of the display 28 are associated with each other. In this way, a graphical user interface (GUI) that makes the user feel as if the user can directly operate the screen displayed on the display 28 can be provided.

For the touch panel 70a, any type of touch panel may be used among various types of touch panels, such as resistance film type, electrostatic capacitance type, surface acoustic wave type, infrared light type, electromagnetic induction type, image recognition type, and optical sensor type touch panels. Depending on the type of the touch panel 70a, different detection methods are available, such as a detection method of detecting a touch operation when the user touches the touch panel 70a and a detection method of detecting a touch operation when the user's finger or a stylus approaches the touch panel 70a, but any of the detection methods may be used.

In the foregoing example, the case where the present exemplary embodiment is applied to the digital camera 100 is described, but the present exemplary embodiment is not limited thereto.

<Commercial Product Review Mode>

The digital camera 100 according to the present exemplary embodiment has a commercial product review mode as one of the imaging modes.

In normal imaging modes other than the commercial product review mode, the AF processing is performed to preferentially focus on a person's face by using the object detection result. In the commercial product review mode, the control to preferentially focus on a person's face is not performed. The AF processing is performed to focus on an object that is detected by the object detection processing and is included in a set focus area, regardless of whether the object is a person's face or a product.

In the normal imaging modes, the AF processing may sometimes be performed to preferentially focus on a larger object. In the commercial product review mode, the AF processing is performed to preferentially focus on an object located at a shorter distance.

Further, in the commercial product review mode, it is possible to preset, as a focus area in AF imaging, a focus area for the commercial product review mode that is different from that for the normal imaging modes. Basically, in the commercial product review mode, it is desirable to focus on a person, who is a reviewer, and a commercial product to be introduced by the reviewer. Thus, the focus area is not set to "wide", which brings an entire image into focus, but is set to "zone", which enables the user to select a position of a zone to be brought into focus. If the user presets the position of the zone to be brought into focus, the AF processing is performed to automatically focus on an object in this zone. The user can easily set the reviewer and the commercial product to be introduced, as AF target objects by presetting, as the focus area, the zone including the position of the reviewer and the position of the commercial product in the imaging.

Figure 4A:
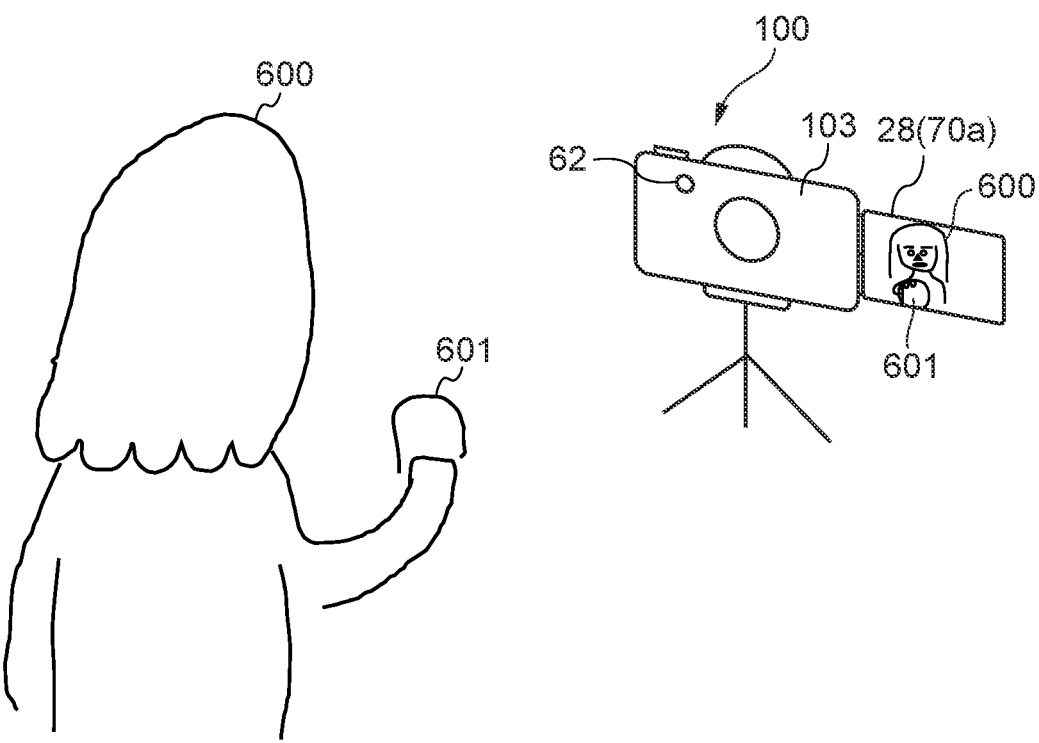
FIGS. 4A and 4B are diagrams illustrating a commercial product review mode.
Figure 4B:
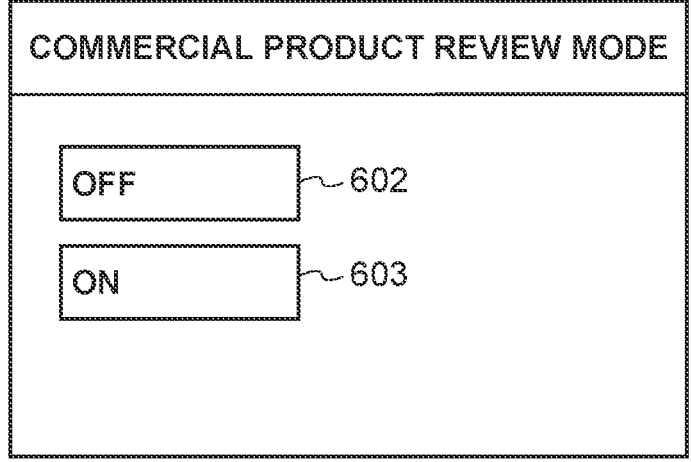

With reference to FIGS. 4A and 4B, the commercial product review mode will be described. FIG. 4A illustrates a case where a person (a reviewer) 600 uses the digital camera 100 to capture an image of a state where the person (the reviewer) 600 is introducing a product (a commercial product) 601. The person (the reviewer) 600 looks at the lens 103 of the digital camera 100 to introduce the product 601. In the example of FIG. 4A, the display surface of the display 28 is turned toward the person (the reviewer) 600.

In the commercial product review mode, the control to preferentially focus on a person's face is not performed. Thus, if the reviewer 600 does an action, such as bringing the commercial product 601 close to the lens 103 while holding the commercial product 601 with the hand of the reviewer 600 in order to show details of the commercial product 601, the system control unit 50 performs the AF processing to focus on the commercial product 601 located at a shorter distance. In this way, in a case where the imaging mode of the digital camera 100 is the commercial product review mode, the system control unit 50 can perform the AF processing by performing focusing control to focus on the object located at a shorter distance, regardless of the type (person or product) or size of the object.

The commercial product review mode can be selected by the user. FIG. 4B illustrates a screen for enabling the user to select the commercial product review mode. In the case of introducing the commercial product 601, the user selects a button 603, and in the case of not introducing the commercial product 601, the user selects a button 602.

<Flowchart>

Figure 3:
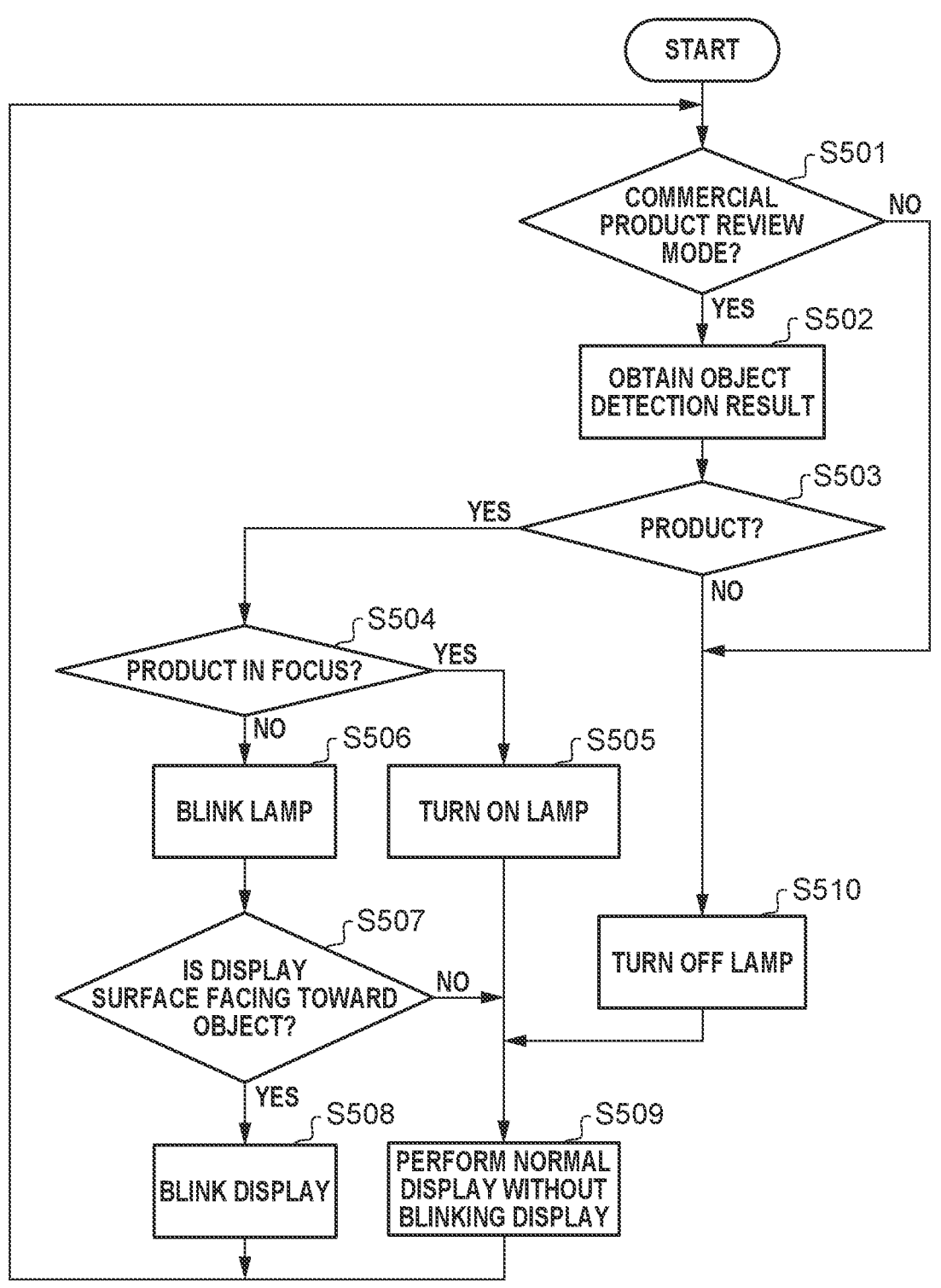
FIG. 3 is a flowchart illustrating details of processing for providing a notification of a focus state in an imaging mode.

FIG. 3 is a flowchart illustrating details of processing for notifying the user of a focus state in the imaging mode. This processing is implemented by the system control unit 50 loading a program stored in the non-volatile memory 56 into the system memory 52 and executing the loaded program. The processing is performed until the imaging mode ends or the digital camera 100 is powered off. In other words, the processing is repeated as long as the imaging mode continues.

In step S501, the system control unit 50 determines whether the digital camera 100 is in the commercial product review mode.

In a case where the system control unit 50 determines that the digital camera 100 is in the commercial product review mode (YES in step S501), the processing proceeds to step S502. In a case where the system control unit 50 determines that the digital camera 100 is not in the commercial product review mode (NO in step S501), the processing proceeds to step S510.

In step S502, to perform the AF processing on an object in the zone set in advance as described above, the system control unit 50 causes the image processing unit 24 to perform the object detection processing and obtains the object detection result. If an object to be brought into focus is within the zone, the image processing unit 24 detects the object as the AF target object.

In step S503, the system control unit 50 determines whether the AF target object is a product, based on the object detection result obtained from the image processing unit 24 in step S502. In a case where the system control unit 50 determines that the AF target object is a person or is not present (NO in step S503), the processing proceeds to step S510. In a case where the system control unit 50 determines that the AF target object is a product (YES in step S503), the processing proceeds to step S504.

In step S504, the system control unit 50 obtains a focus detection result on the AF target object from the focus detection unit 11 and determines whether the AF target object is in focus. At this time, since the AF target object is determined to be a product in step S503, in step S504, the system control unit 50 determines whether the product as the AF target object is in focus. In a case where the product as the AF target object is in focus (YES in step S504), the processing proceeds to step S505. In a case where the product as the AF target object is not in focus (NO in step S504), the processing proceeds to step S506.

In step S505, since the product as the AF target object is determined to be in focus in step S504, the system control unit 50 turns on the lamp 62, and the processing proceeds to step S509. In a case where the product as the AF target object is in focus, turning on the lamp 62 enables the user to keep capturing the image while confirming that the AF target object is a product, not a person and the product is in focus.

In step S506, since the product as the AF target object is determined to be not in focus in step S504, the system control unit 50 blinks the lamp 62, and the processing proceeds to step S507. In a case where the product as the AF target object is not in focus, blinking the lamp 62 makes it possible to notify the user that the AF target object is a product, not a person and the product is not in focus. At the point when the user has recognized that the product as the AF target object is not in focus, the user can adjust the focus state to bring the product into focus, whereby the user can save time and labor to record the image again. As described above, the system control unit 50 can notify the user of the focus state of the product by switching the notification method using the lamp 62 between turning on the lamp 62 and blinking the lamp 62 depending on the focus state. Even in a case where a person captures a plurality of objects in order to, for example, introduce two commercial products (two products), the system control unit 50 sets an object located at a shorter distance as the AF target object and can notify the user that the AF target object is the product and what the focus state of the product looks like if the AF target object is the product.

In step S507, the system control unit 50 determines whether the display surface of the display 28 is facing toward the object. In a case where the display surface of the display 28 is facing toward the object side (YES in step S507), the processing proceeds to step S508. In a case where the display surface of the display 28 is not facing toward the object side (NO in step S507), the processing proceeds to S509.

In step S508, since the display surface of the display 28 is determined to be facing toward the object side in step S507, the system control unit 50 blinks the display 28, and the processing returns to step S501. In a case where the product as the AF target object is not in focus, blinking the display 28 makes it possible to notify the user that the product is not in focus. The notification is performed also by blinking the display 28, in addition to blinking the lamp 62 in step S506, because it is important to focus on the product (the commercial product) in the commercial product review mode. In a case where the display surface of the display 28 is determined to be not facing toward the object side in step S507, blinking the display 28 is not performed in step S509 because it is highly possible that a user different from the object is checking the captured image. A method of providing the notification that the product is not in focus by blinking the display 28 will be described in detail below with reference to FIGS. 6A, 6B, and 6C.

In step S509, since the display surface of the display 28 is determined to be not facing toward the object side in step S507, the system control unit 50 causes the display 28 to perform normal display without blinking the display 28, and the processing returns to step S501.

In step S510, since the digital camera 100 is determined to be not in the commercial product review mode in step S501, or the AF target object is determined to be a person or not present in step S503, the system control unit 50 turns off the lamp 62, and the processing proceeds to step S509. In this way, turning off the lamp 62 makes it possible to notify the user that the AF target object is not a product.

As described above, the system control unit 50 controls whether to provide the notification using the lamp 62 and determines whether to provide the notification using the lamp 62 depending on the type of object. In the present exemplary embodiment, the notification of the focus state using the lamp 62 is provided in a case where the AF target object is a product, whereas the notification of the focus state using the lamp 62 is not provided in a case where the AF target object is a person. In other words, even in a case where a person is detected as an object, the system control unit 50 provides the notification of the focus state of a product using the lamp 62, so that the lamp 62 notifies the reviewer (the person detected as the object) about the focus state of the product.

In the present exemplary embodiment, notifications of different focus states of a product are provided using the lamp 62 with different notification methods. For example, the lamp 62 is turned on if the product is in focus, and the lamp 62 is blinked if the product is not in focus. Especially, blinking the lamp 62 to notify the user that the product is not in focus makes it possible to emphatically provide the notification to the user.

In FIG. 3, different notification methods, i.e., turning on, blinking, and turning off the lamp 62 are performed depending on the focus state. Alternatively, other notification methods, such as changing the color of the lamp 62 turning on or blinking, and changing the blinking period of the lamp 62, can be used depending on the focus state. As one of the other notification methods, such as changing the color of the lamp 62 turning on or blinking, and changing the blinking period of the lamp 62, depending on the focus state, an example will be described in which the system control unit 50 changes the color of the lamp 62 depending on the type of object and/or the focus state of the product.

In a case where the AF target object is a person, the lamp 62 emits white light to provide the notification thereof. In a case where the AF target object is a product and is in focus, the lamp 62 emits green light to provide the notification thereof. In a case where the AF target object is a product but is not in focus, the lamp 62 emits red light to provide the notification thereof. In this way, by changing the color of the lamp 62 to green, which is the same color as that of the focus frame indicating the in-focus state on the display 28, to indicate the in-focus state, and changing the color of the lamp 62 to a color different from green to indicate the out-of-focus state, it is possible for the user to easily understand the focus state.

Figure 5A:
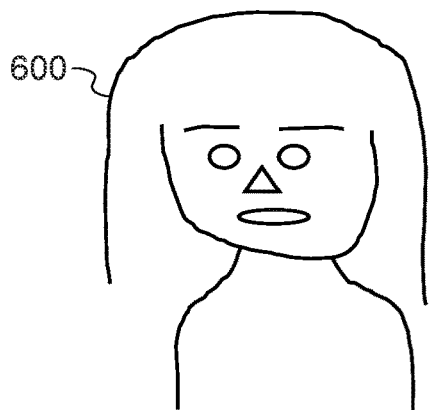
FIGS. 5A, 5B, and 5C are diagrams each illustrating an example of a focus state of a person and a product (a commercial product).
Figure 5B:
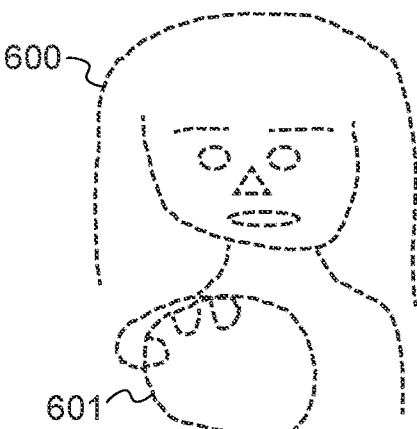
Figure 5C:
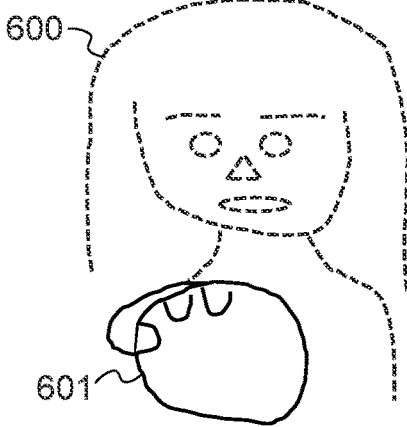

FIGS. 5A, 5B, and 5C each illustrate a detection state of the person 600 and the focus state of the product (the commercial product) 601. Referring to FIG. 5A, the face of the person 600 is detected, and the lamp 62 is turned off as described in step S510 of the flowchart in FIG. 3. FIG. 5B illustrates a state where the person 600 is introducing the product 601, and the product 601 is present in front of the person 600. FIG. 5B illustrates a state where the product 601 is detected as an object, and the digital camera 100 is trying to focus on the product 601 but the product 601 is out of focus. In this case, the lamp 62 blinks as described in step S506 of the flowchart in FIG. 3. FIG. 5C illustrates a state where the person 600 is introducing the product 601, and the product 601 is present in front of the person 600. FIG. 5C illustrates a state where the product 601 is detected as an object and is in focus. The lamp 62 is turned on as described in step S505 of the flowchart of FIG. 3.

In this way, it is possible to provide the notification of the focus state of the product as the AF target object by turning on, blinking, or turning off the lamp 62.

Figure 6A:
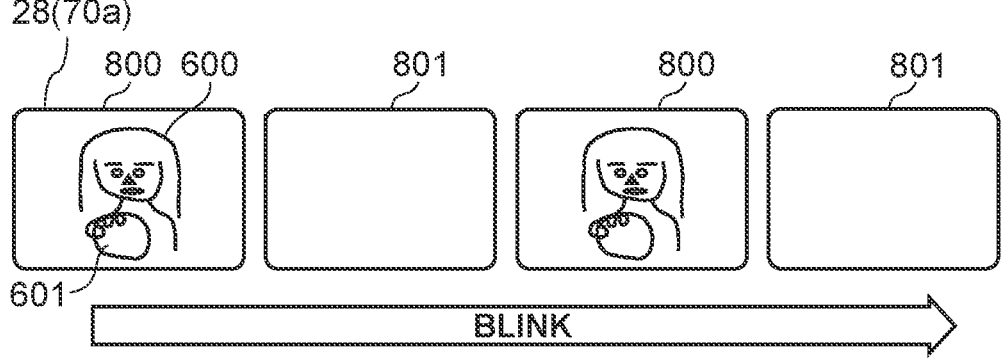
FIGS. 6A, 6B, and 6C are diagrams each illustrating an example of a method for providing a notification of a focus state by blinking a display.
Figure 6B:
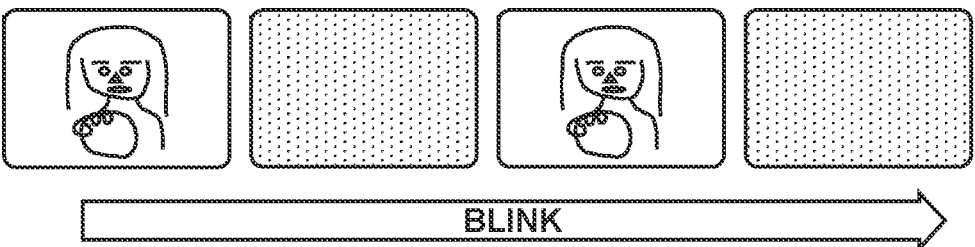
Figure 6C:
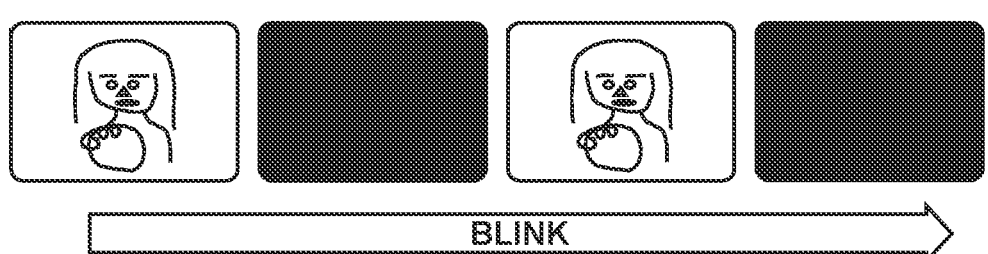

With reference to FIGS. 6A, 6B, and 6C, an example of a method in which the system control unit 50 causes the display 28 to blink in step S508 will be described. The blinking state of the display 28 is expressed by alternately displaying a live view display state 800 and a screen-filling state 801. FIG. 6A illustrates a case where the entire screen is filled with white, FIG. 6B illustrates a case where the entire screen is filled with gray, and FIG. 6C illustrates a case where the entire screen is filled with black. It is possible to indicate different notifications by changing the blinking color, the blinking period, or the like. In this way, notifying the object (the person 600) that the product 601 is not in focus by not only blinking the lamp 62 but also blinking the display 28 enables the object (the person 600) to recognize that the product 601 is not in focus without watching the display 28. Accordingly, the object (the person 600) can capture the image without looking away from the lens 103. As a result, it is possible to record the image that does not give a sense that the object behaves unnaturally.

In the above-described exemplary embodiment, whether to provide the notification using the lamp 62 is determined depending on whether the commercial product review mode is set. As a modification example, whether to provide the notification using the lamp 62 may be determined depending on whether an image is captured in the moving image capturing mode or the still image capturing mode. In a case where the image is a moving image, the recording time is longer than that of a still image. Thus, if the moving image that is not in focus is recorded, it takes significant time and labor to record the moving image again. Accordingly, in a case where the image is a still image, the notification of the focus state using the lamp 62 is not provided, and in a case where the image is a moving image, the notification of the focus state using the lamp 62 is provided. In this way, since the user can confirm the out-of-focus state without looking away from the lens 103 during the imaging, the user can record the in-focus image without capturing the image again.

Alternatively, in the case of recording the moving image into the recording medium 200, the notification of the focus state using the lamp 62 may be provided, and in the case of waiting for recording the moving image into the recording medium 200, the notification of the focus state using the lamp 62 may not be provided. While the user stands by for recording the moving image into the recording medium 200, the user can check the focus state on the display 28 or the like, and thus the notification of the focus state using the lamp 62 may not necessarily be provided.

With the imaging apparatus and the control method for the imaging apparatus according to the exemplary embodiment of the disclosure, it is possible for an object to check a focus state without looking away from a lens.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-199796, filed Dec. 14, 2022, which is hereby incorporated by reference herein in its entirety.

What is claimed is:

1. An imaging apparatus comprising:

an imaging sensor configured to capture an image of an object through a lens;

a light-emitting device configured to provide a notification of a focus state; and one or more processors; and one or more memories containing instructions that, when executed by the one or more processors, perform operations as:

a focus detection unit configured to detect a focus state of the object, and a notification control unit configured to control whether to provide the notification of the focus state using the light-emitting device, wherein the light-emitting device is arranged near the lens on a surface of a side of the imaging apparatus on which the lens is arranged, and wherein the notification control unit determines whether to provide the notification of the focus state of the object using the light-emitting device.

2. The imaging apparatus according to claim 1, wherein the operations further comprise operations as a focus control unit configured to perform control to focus on an autofocus (AF) target object, wherein the focus detection unit detects a focus state of the AF target object, and wherein the light-emitting device provides a notification of the focus state of the AF target object.

3. The imaging apparatus according to claim 1, further comprising a display configured to move with respect to a main body of the imaging apparatus, wherein a distance from the lens to the light-emitting device is shorter than a distance from the lens to a display surface of the display in a case where the display surface faces toward an object side.

4. The imaging apparatus according to claim 1, wherein the notification control unit determines whether to provide the notification of the focus state of the object using the light-emitting device, depending on a type of the object.

5. The imaging apparatus according to claim 4, wherein in a case where the type of the object is a person, the notification control unit performs control not to provide the notification of the focus state of the person using the light-emitting device, and wherein in a case where the type of the object is a product, the notification control unit performs control to provide the notification of the focus state of the product using the light-emitting device.

6. The imaging apparatus according to claim 4, wherein the operations further comprise operations as a focus control unit configured to preferentially focus on an object located at a shorter distance and not to preferentially focus on a person, wherein in a case where a focus control target object is a product, the notification control unit performs control to provide the notification of the focus state of the product using the light-emitting device, and wherein in a case where the focus control target object is a person, the notification control unit performs control not to provide the notification of the focus state of the person using the light-emitting device.

7. The imaging apparatus according to claim 6, wherein in a case where an imaging mode of the imaging apparatus is a commercial product review mode, the focus control unit performs control to preferentially focus on the object located at the shorter distance and not to preferentially focus on the person.

8. The imaging apparatus according to claim 1, wherein the operations further comprise operations as a recording unit configured to record the image captured by the imaging sensor into a recording medium, wherein in a case where the image to be recorded by the recording unit is a still image, the notification control unit performs control not to provide the notification of the focus state using the light-emitting device, and wherein in a case where the image to be recorded by the recording unit is a moving image, the notification control unit performs control to provide the notification of the focus state using the light-emitting device.

9. The imaging apparatus according to claim 8, wherein in a case where the recording unit is recording the moving image, the notification control unit performs control to provide the notification of the focus state using the light-emitting device, and wherein in a case where the recording unit stands by for recording the moving image, the notification control unit performs control not to provide the notification of the focus state using the light-emitting device.

10. The imaging apparatus according to claim 1, wherein the light-emitting device is a light-emitting diode.

11. The imaging apparatus according to claim 1, wherein the notification control unit performs control to provide the notification of the focus state by turning on or blinking the light-emitting device.

12. The imaging apparatus according to claim 11, wherein in a case where the object is in focus, the notification control unit performs control to provide the notification of the focus state by turning on the light-emitting device, and wherein in a case where the object is not in focus, the notification control unit performs control to provide the notification of the focus state by blinking the light-emitting device.

13. The imaging apparatus according to claim 12, wherein in a case where the object is a person, the notification control unit performs control not to provide the notification of the focus state of the object by turning off the light-emitting device, and wherein in a case where the object is a product, the notification control unit performs control to provide the notification of the focus state of the object by turning on the light-emitting device in the case where the object is in focus, and to provide the notification of the focus state by blinking the light-emitting device in the case where the object is not in focus.

14. The imaging apparatus according to claim 1, wherein the notification control unit performs control to provide a notification of a type of the object and the focus state of the object by changing a color of the emitted light from the light-emitting device depending on the type of the object and the focus state of the object.

15. The imaging apparatus according to claim 1, further comprising a display configured to move with respect to a main body of the imaging apparatus, wherein in a case where a display surface of the display is facing toward the object, the notification control unit performs control to provide the notification of the focus state using the display in addition to using the light-emitting device, and wherein in a case where the display surface of the display is not facing toward the object, the notification control unit performs control to provide the notification of the focus state using the light-emitting device.

16. A method for controlling an imaging apparatus, the method comprising:

capturing an image of an object through a lens;

detecting a focus state of the object;

providing a notification of the focus state; and controlling whether to provide the notification of the focus state, wherein the notification of the focus state is provided using a light-emitting device that is arranged near the lens on a surface of a side of the imaging apparatus on which the lens is arranged, and wherein the controlling includes determining whether to provide the notification of the focus state of the object using the light-emitting device.

17. A non-transitory computer-readable storage medium storing a program for causing a computer to execute the method according to claim 16.

\* \* \* \* \*